Oct. 4, 1927.

W. F. HENDRY

DRY CELL

Filed Nov. 8, 1923

1,644,017

INVENTOR
W. F. Hendry
BY
his ATTORNEY

Patented Oct. 4, 1927.

1,644,017

UNITED STATES PATENT OFFICE.

WILLIAM F. HENDRY, OF OSSINING, NEW YORK, ASSIGNOR, BY MESNE ASSIGNMENTS, TO NATIONAL CARBON COMPANY, INC., OF NEW YORK, N. Y., A CORPORATION OF NEW YORK.

DRY CELL.

Application filed November 8, 1923. Serial No. 673,538.

This invention relates to dry cells and more particularly to dry cells of the type known as desiccated cells.

It is the object of the present invention to provide a dry cell in which, after the cell is assembled water or an electrolyte may be introduced therein in a manner thoroughly to humidify the depolarizing mix, and also to provide numerous passages between the positive and negative electrodes so that gas pressures at any point may find ready outlet. That gas pressures are formed in dry cells is well known and is evidenced by the splitting of the zinc cans where batteries are subjected to heavy service. The gas is ammonia formed by the chemical action taking place when the cell is delivering current. In the present construction this pressure is relieved by the gas escaping thru the numerous passages in the depolarizing mix, thru the holes in the carbon electrode to the central cavity and bubbling up thru the water and if the pressure is of sufficient magnitude lifting the cork stopper of the carbon electrode or other reservoir of liquid.

The invention will be more fully understood from the following detailed description of one embodiment thereof and the appended claims.

Figure 1:
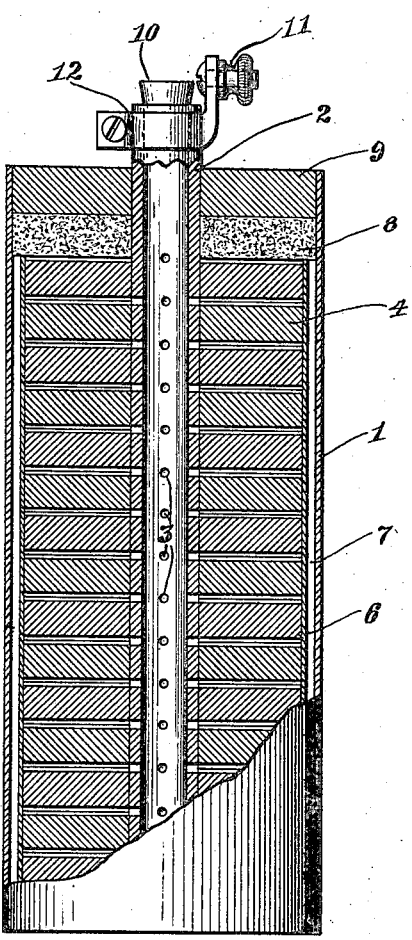
Figure 3:
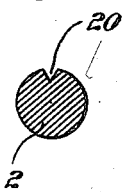
Figure 2:
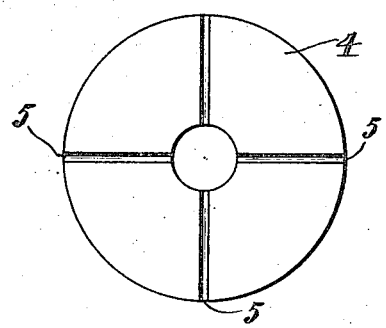

In the drawings Fig. 1 shows a cross section of a dry cell constructed in accordance with the present invention; Fig. 2 is a top plan view of one of the washers used in constructing the dry cell, and Fig. 3 is a sectional view of a modified form of carbon electrode.

The dry cell is composed of a zinc container 1 within which a centrally located carbon electrode 2 is provided. The carbon electrode 2 is perforated longitudinally throughout its length and is provided also with a number of perforations 3 at right angles to its longitudinal axis. The carbon electrode is surrounded by a plurality of superimposed washers 4 compacted of depolarizing and carbonaceous material. Each washer is provided in its upper or lower face or both with grooves 5 at right angles to the axis of these washers. The perforations 3 are so provided that when the washers are in place as shown in Fig. 1, a perforation 3 registers with a groove 5, the diameter of a perforation 3 being substantially equal to that of a circle formed by two superimposed grooves 5. Good results may, however, be obtained even in case the grooves and openings do not register. The number of perforations 3 may, of course, be materially reduced.

The washers 4 may be wrapped in a cellulose container 6, the space 7 between such container and zinc can 1 being filled with paste. However, instead of such bag-type construction, the washers and the zinc can may be separated by paper coated with paste. The cell is sealed with a layer of sand 8 and a layer of pitch 9. The upper end of the carbon electrode may be closed by means of a stopper 10, a connection with the carbon electrode being through a binding post 11 mounted thereon by means of a bracket 12 or in any other well known manner.

The dry cell constructed in accordance with the present invention may be used either as a dry cell proper, or as a desiccated cell. If used as an ordinary dry cell it may be assembled in the manner disclosed in my copending application, Serial No. 654,611; filed July 30, 1923. If used as a desiccated cell, then it is shipped with the washers and other elements shown in the drawing in place but without previously soaking them. When it is desired to put the cell into use water or electrolyte is poured inside of the carbon electrode. Due to the manner in which the perforations 3 in the carbon electrode are provided and the provision of the corrugations in the washers 4, water will be uniformly distributed throughout the dry cell, whereby better operating results will be obtained than if it were necessary to depend on the water seeping through the relatively heavy layer of depolarizing mixture or washers. I am aware that attempts have been made to secure the results described by means of hollow carbon electrodes with lateral perforations; such construction is described in Cooper's Primary Batteries (1916 edition, pages 281 and 287) but the batteries described therein did not achieve complete success because no provision was made to insure free circulation through all parts of the depolarizing mix and even distribution of moisture about the outside of the latter as I do by means of the passageways intersecting formed by the grooves in the washers.

Due to the fact that such corrugated washers insure further circulation of the water and electrolyte through the depolarizing mix, their use in connection with the conventional solid carbon electrode leads also to increased efficiency.

It will be obvious to those skilled in the art that in addition to the modifications herein suggested, the invention is capable of various embodiments without departing from the spirit thereof. One of such embodiments is illustrated in Fig. 3 in which a solid carbon electrode 2 is shown provided with a triangular slot 20 throughout its length. When such electrode is inserted in a pile up of washers like the one illustrated in Fig. 2, then the triangular space 20 will serve as a reservoir for the water.

What I claim is:

1. In a dry cell, a circular zinc electrode, a carbon electrode centrally located therein, depolarizing mix between said electrodes, a cellulose layer separating said mix from said zinc electrode, and intersecting radial passageways in said mix extending from said carbon electrode towards said layer.

2. In a dry cell, two electrodes, depolarizing mix separating said electrodes, longitudinal perforations and a plurality of communicating lateral perforations in one of said electrodes, and a plurality of passageways in said depolarizing mix communicating with said lateral perforations.

3. In a dry cell, a zinc container electrode, a centrally located carbon electrode, depolarizing mix surrounding said carbon electrode, a longitudinal perforation and a plurality of communicating lateral perforations in said carbon electrode, and a plurality of passageways in said depolarizing mix communicating with said lateral perforations.

4. In a dry cell, two electrodes, a plurality of washers compacted of depolarizing material provided one on top of the other between said electrodes, grooves in said washers, and an opening through which water may be supplied to said grooves.

5. In a dry cell, a zinc container electrode, a carbon electrode centrally located within said zinc electrode, said carbon electrode being longitudinally perforated and provided with a plurality of lateral perforations communicating with said longitudinal perforation, a plurality of washers compacted of depolarizing and carbonaceous materials provided one on top of the other and encircling said carbon electrode, and grooves in said washers cooperating with said horizontal perforations when the cell is assembled.

6. In a dry cell, a zinc container electrode, a carbon electrode centrally located within said zinc electrode, said carbon electrode being longitudinally perforated parallel to its axis and provided with a plurality of lateral perforations at right angles to its axis and communicating with said longitudinal perforation, a plurality of washers compacted of depolarizing and carbonaceous materials provided one on top of the other and encircling said carbon electrode, and a plurality of grooves in the upper and lower faces of each washer cooperating with said lateral perforations when the cell is assembled.

7. In a dry cell, two electrodes, depolarizing mix between said electrodes, a treelike system of intersecting radiating passageways thru said mix and carbon electrodes for the purpose and even distribution of relieving internal pressure or introduction of water or electrolyte.

8. In a dry cell, two electrodes, tablets compacted of depolarizing mix separating said electrodes, and grooves in said tablets.

9. In a dry cell, a container electrode, a second electrode centrally located therein, a plurality of tablets compacted of depolarizing mixture surrounding said second electrode, a cellulose layer separating said tablets from said container electrode, and grooves in said tablets radiating towards said layers.

In witness whereof, I hereunto subscribe my name this 7th day of November, 1923.

WILLIAM F. HENDRY.